United States Patent [19]

Mitsui et al.

[11] Patent Number: 5,220,444
[45] Date of Patent: Jun. 15, 1993

[54] REFLECTIVE-TYPE LIQUID CRYSTAL DISPLAY DEVICE WITH ETCHED OXIDE LAYER BETWEEN SUBSTRATE AND METAL FILM AND METHOD FOR PRODUCING SAME

[75] Inventors: Seiichi Mitsui; Naofumi Kimura; Yutaka Ishii, all of Nara, Japan

[73] Assignee: Sharp Kabushiki Kaisha, Osaka, Japan

[21] Appl. No.: 731,818

[22] Filed: Jul. 17, 1991

[30] Foreign Application Priority Data

Jul. 17, 1990 [JP] Japan ................ 2-188775

[51] Int. Cl.⁵ .............................. G02F 1/13
[52] U.S. Cl. ........................ 359/70; 359/87
[58] Field of Search ............ 359/87, 70, 900

[56] References Cited

U.S. PATENT DOCUMENTS

| | | | |
|---|---|---|---|
| 4,106,859 | 8/1978 | Doriguzzi et al. | 359/70 |
| 4,239,346 | 12/1980 | Lloyd | 359/59 |
| 4,431,272 | 2/1984 | Yazawa et al. | 359/87 |
| 4,456,336 | 6/1984 | Chung et al. | 359/74 |
| 4,519,678 | 5/1985 | Komatsubara et al. | 359/74 |
| 4,904,060 | 2/1990 | Grupp | 359/70 |

FOREIGN PATENT DOCUMENTS

2358415  6/1974  Fed. Rep. of Germany ........ 359/70
57-54771 11/1982 Japan .
62-91918  4/1987 Japan .

OTHER PUBLICATIONS

D. L. White et al, Journal of Applied Physics, vol. 45, No. 11, Nov. 1974, pp. 4718-4723.
T. Koizumi et al, Proceedings of the SID, vol. 29/2, 1988.

Primary Examiner—William L. Sikes
Assistant Examiner—Anita Pellman Gross
Attorney, Agent, or Firm—Birch, Stewart, Kolasch & Birch

[57] ABSTRACT

A reflective-type liquid crystal display device and a method for producing same, the reflective-type liquid crystal display device including a transmissive substrate including pixel electrodes, a reflection plate comprising a core plate having an uneven surface on one side thereof and a metal thin layer covering the uneven surface of the substrate, a liquid crystal layer interposed between the substrate and the reflection plate.

5 Claims, 5 Drawing Sheets

REFLECTIVE-TYPE LIQUID CRYSTAL DISPLAY DEVICE WITH ETCHED OXIDE LAYER BETWEEN SUBSTRATE AND METAL FILM AND METHOD FOR PRODUCING SAME

BACKGROUND OF THE INVENTION

1. Field of the Invention

The present invention relates to a reflective-type liquid crystal display panel without backlight, and a method for producing same.

2. Description of the Prior Art

The recent rapid development of liquid crystal display panels has paved the way to applications in many fields such as word processors, lap-top personal computers, and portable televisions. A special attention is being paid to a reflective-type liquid crystal display device without backlight, because the display device without backlight is lightweight, thin, and consumes less power.

In conventional reflective-type liquid crystal display panels a TN (twisted nematic mode) or a STN (super-twisted nematic mode) are used. In these modes a linear polarizer is necessarily used, but under the polarizer, half of the natural light is wasted in the display. Thus, even if an intensified natural light is used, the image display tends to be dark.

In order to solve this problem, a special mode is proposed for fully utilizing the natural light. For example, a cholesteric-nematic phase-change type guest-host mode is proposed by D. L. White and G. N. Taylor ("J. Appl. Phys." 45, Page 4718, 1974). In this guest-host mode, a cholesteric liquid crystal, which is a host liquid crystal, tends to change to a nematic phase under its own electric field. A reflective-type multicolor display device is also proposed, which is a phase change type guest-host system equipped with a micro color filter ("Proceedings of the SID", vol. 29, page 157, 1988).

In order to display a brighter image in the mode in which no polarizer is needed, it is essential to intensify the light which tends to scatter perpendicularly to the screen. To achieve this, it is essential to control the surface roughness of the reflection plate. The second-mentioned literature teaches that the surface of a glass substrate is roughened by abrasives and then the roughened surface is etched with hydrofluoric acid for a controlled period of time, thereby securing an adequately flattened surface. The flattened surface is covered with a metal thin layer such as an Ag layer.

However, the problems are that the reflective surface of the glass substrate must be first roughened by abrasives, thereby making it difficult to secure a uniform surface of the substrate. In addition, such rugged surfaces makes it difficult to reproduce the same pattern.

SUMMARY OF THE INVENTION

The reflective-type liquid crystal display panel of this invention, which overcomes the above-discussed and numerous other disadvantages and deficiencies of the prior art, comprises a transmissive substrate including pixel electrodes, a reflection plate comprising a core plate having an uneven or rugged surface on a first surface thereof and a metal thin layer covering the uneven surface of the substrate, a liquid crystal layer interposed between the substrate and the reflection plate.

In a preferred embodiment, the uneven surface of the substrate comprises a repetition of hills and valleys, the hills being arranged at not larger than 100 $\mu$m.

In a preferred embodiment, wherein the surface on which the metal thin layer is formed is disposed toward the liquid crystal layer.

In a preferred embodiment, the metal thin layer functions as a counter electrode for the pixel electrodes with the liquid crystal layer being interposed.

According to the present invention, there is a method for producing a reflective-type liquid crystal display device, the method comprising the steps of preparing a glass substrate, growing an oxide layer on a first surface of the substrate, etching the oxide layer of the substrate to form an uneven surface on the first surface of the substrate, and forming a metal thin layer on the uneven surface.

Thus, the invention described herein makes possible the objectives of (1) providing a reflective-type liquid crystal display panel capable of improved optical characteristics, and (2) providing a reflective-type liquid display capable of economy in production.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1A:
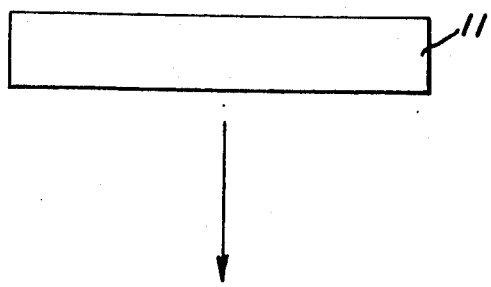
FIGS. 1a to 1d are diagrammatic views showing the process of fabricating a reflection plate according to the present invention.
Figure 1B:
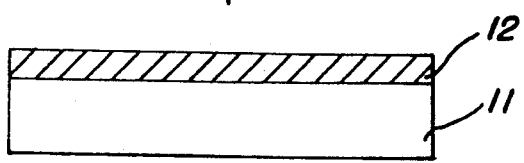
Figure 1C:
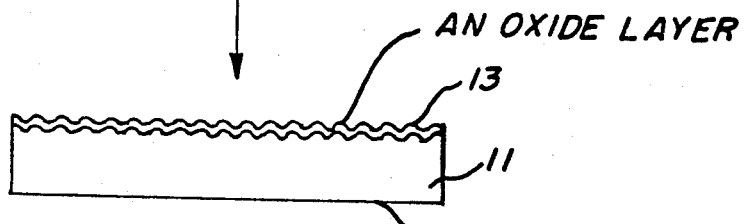

Referring to FIGS. 1a to 1d, a process for fabricating a reflection plate used in a reflective-type liquid crystal display device will be described:

As shown in FIG. 1a, a glass substrate 11 (manufactured by Corning, Item No. 7059) having a thickness of 1.1 mm is prepared, and an oxide is grown on one surface of the substrate 11 by sputtering so as to form an oxide layer 12 (FIG. 1b). Oxides can be $SiO_2$, $Al_2O_3$, $ZrO_2$, SiO, $TiO_2$, $SnO_2$, ITO (indium tin oxide). The thickness of the oxide layer is preferably in the range of 0.01 to 1.0 $\mu$m. In the illustrated example, $SiO_2$ was used and grown to a thickness of 0.1 $\mu$m.

A liquid mixture of 25° C. of one part of 47% hydrofluoric acid and 100 parts of 60% nitric acid at the ratio of 1 to 100 by weight was prepared. A glass substrate on which an oxide layer 12 was grown was submerged in the liquid mixture for 10 minutes to form an uneven surface 13 on the top surface of the substrate 11. In this specification, the "top" and "bottom" are relative words; in the drawing, the upper surface is called "top surface" and the lower surface "bottom".

The uneven surface 13 includes a plurality of grooves which consist of hills and valleys alternately repeated. The hills are 0.8 μm on average, arranged at average pitches of 5 μm. The pitch means a mean distance between adjacent hills. The bottom surface 10 of the substrate 11 is evenly etched to form no uneven surface and maintains transparent. It is not necessary to cover the bottom surface with a resist or the like.

Figure 1D:
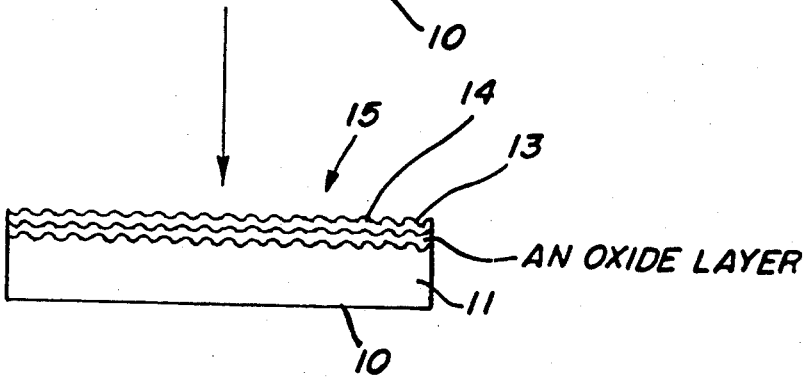

The uneven surface 13 of the substrate 11 is covered with a metal thin layer 14 (FIG. 1d). The metal thin layer 14 can be made of Al, Ni, Cr or Ag. The thickness of the metal thin layer 14 is preferably in the range of 0.01 to 1.0 μm. In this example, Ag was deposited to form the metal thin layer 14 by a vapor deposition method. In this way a reflection plate was obtained.

The reflection characteristics are measured by the following manner:

When a reflection plate 15 is used in a liquid crystal display device, a surface of the reflection plate keeps contact with the liquid crystal layer. It is preferable to measure the reflective characteristics of the reflection plate as it keeps contact with the liquid crystal layer. A liquid crystal layer and a reflection plate have the same refractive index, that is, about 1.5. As a result, when the reflective characteristics is measured from the bottom surface 10 of the reflection plate 15, no difference occurs in the measuring result from when they are measured through the interface between the top surface of the reflection plate 15 and the liquid crystal layer 21. In this example, the reflection characteristics were measured from the bottom surface 10 of the glass substrate 11.

Figure 2:
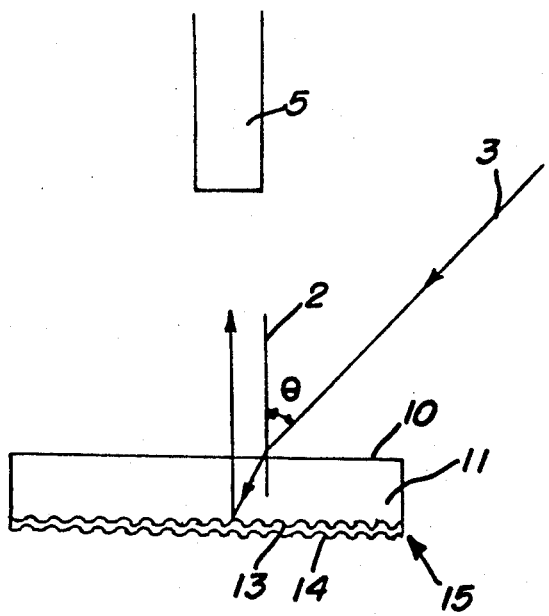
FIG. 2 is a diagrammatic view exemplifying a method for measuring the reflex characteristics of a reflection plate.

As shown in FIG. 2, the reflection characteristics is measured by measuring the scattering light from an incident light to the reflection plate 15 by means of a photomultimeter 5. The incident light 3 is projected on the bottom surface 10 at an angle 8 to a normal 2. The photomultimeter 5 is fixed on the normal 2 passing through a point at which the light is projected on the reflection plate 15.

Figure 3:
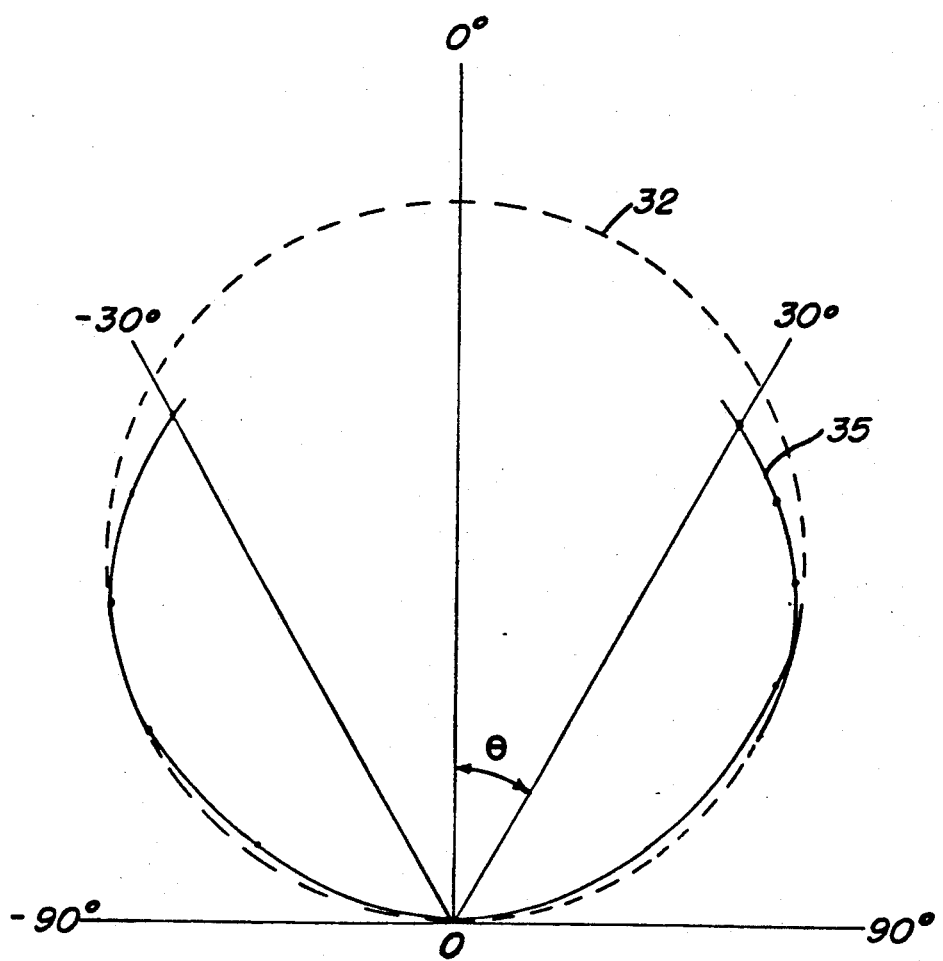
FIG. 3 is a view showing reflective characteristics of the reflection plate produced by the process shown in FIGS. 1a to 1d.

In FIG. 3, the reflective intensity of the light incident to the normal 2 at an angle $\theta$ is expressed in terms of a distance from the origin O in the direction of $\theta$. The circle 32 depicted in dotted lines was obtained when the reflection plate of magnesium oxide was used. The curve 35 of the reflection characteristics is similar to the circle 32, which indicates that the reflection plate 15 has similar reflection characteristics to those of the reference white plate (the magnesium oxide plate). The display device incorporating the reflection plate 15 of this example displayed a bright image.

In the illustrated example, the average pitch between one hill and the next was 5 μm, but up to the pitches of 100 μm, it was found that the same results as in the illustrated example were obtained. If the hills are formed with an average pitch of larger than 100 μm, the incident light to the reflection plate cannot be scattered in all directions.

Figure 4A:
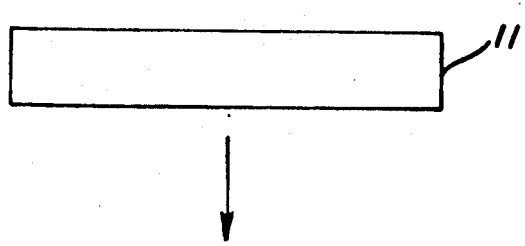
FIGS. 4a to 4d are diagrammatic views showing the process of fabricating a reflection plate according to another aspect of the present invention.
Figure 4B:
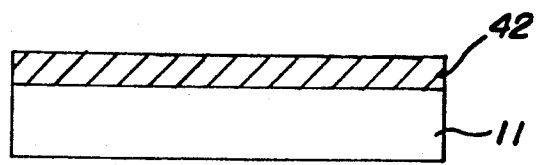

Referring to FIG. 4, a modified process will be described:

As shown in FIG. 4a, a glass substrate (manufactured by Corning, Item No. 7059) having a thickness of 1.1 mm was prepared, and an ITO layer was deposited to a thickness of 0.1 μm by sputtering to form an oxide layer 42 (FIG. 4b).

Oxides can be $SiO_2$, $Al_2O_3$, $ZrO_2$, SiO, $TiO_2$, $SnO_2$, ITO (indium tin oxide). The thickness of the oxide layer is preferably in the range of 0.01 to 1.0 μm. In the illustrated example, $SiO_2$ was used and grown to a thickness of 0.1 μm.

Figure 4C:
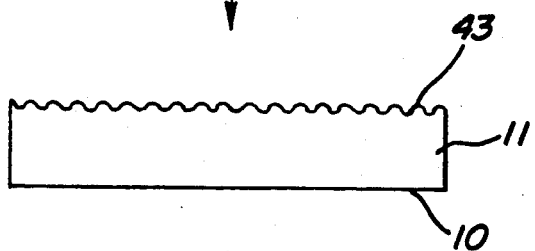

A liquid mixture of 25° C. of one part of 47% hydrofluoric acid and 100 parts of 60% nitric acid at the ratio of 1 to 100 by weight was prepared. A glass substrate on which an oxide layer 42 was grown on the glass substrate 11. The glass substrate 11 was submerged in the liquid mixture for 10 minutes to form an uneven surface 43 on the top surface of the substrate 11 (FIG. 4c). In this way the substrate 11 is provided with an uneven surface 43 on one side.

Figure 4D:
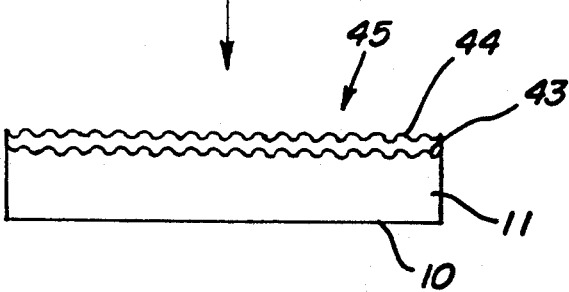

The uneven surface 43 includes a plurality of grooves which consist of hills and valleys alternately repeated. The hills are 0.5 μm with average pitches of 5 μm. The uneven surface 43 is covered with a metal thin layer 44 by a vacuum method (FIG. 4d). In this way a reflection plate 45 was obtained.

The etching was continued for 12 minutes to form a reflection plate 46. This reflection plate 46 also includes hills and valleys alternately arranged wherein the hills were 0.8 μm high, and the average pitches were 5 μm on average.

Figure 5:
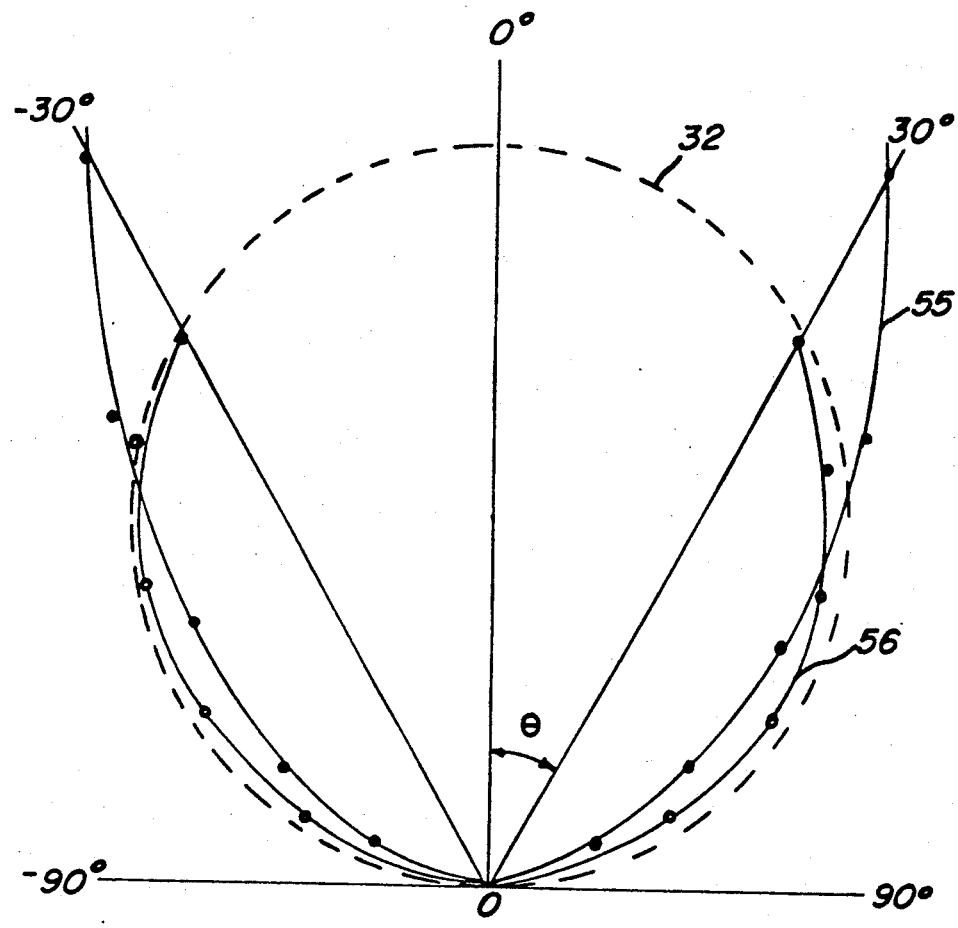
FIG. 5 is a view showing the reflective characteristics of the reflection plate produced by the process shown in FIGS. 4a to 4d.

FIG. 5 shows the curves 55 and 56 of reflection characteristics of the reflection plates 45 and 46. The reflection characteristics were measured by the same manner as described above with respect to FIG. 2. The reflection plate 45 has a small reflectivity toward the normal to the reflection plate 55 when the incidence angle $\theta$ is small, whereas, when the incidence angle $\theta$ is large, the reflectivity toward the normal is large. In contrast, it will be understood that the reflection plate 46 had the same reflection characteristics as those of the reference white plate (the magnesium oxide plate). In this way, by controlling a period of etching the reflectivity toward the normal can be increased as in the reflection plate 45, and the incidence light can be scattered in all directions as in the reflection plate 46.

Figure 6:
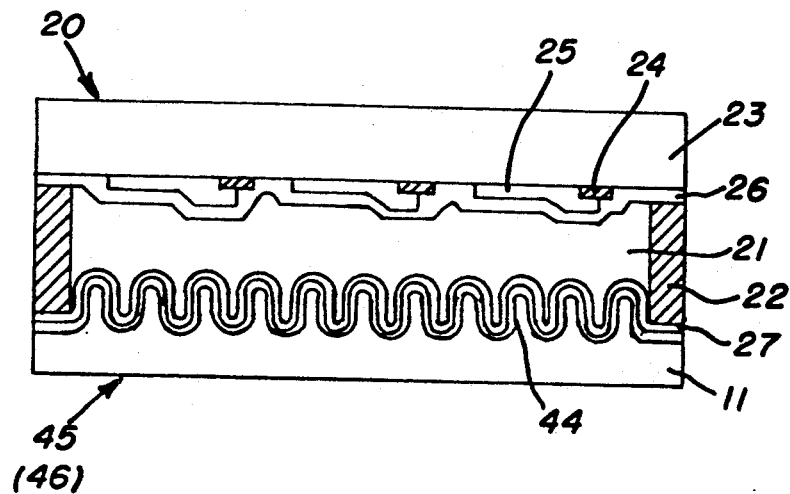
FIG. 6 is a cross-sectional view showing a reflection plate display using the reflection plate produced by the process of FIGS. 4a to 4d.

FIG. 6 shows a cross-section of a reflective-type liquid crystal display device using the reflection plate 45. The device includes an active matrix substrate 20 and the reflection plate 45. The active matrix substrate 20 includes a transparent plate 23 such as glass, thin film transistors (TFT) 24 formed on the substrate 20, and pixel electrodes 25 connected to the TFTs 24. The pixel electrodes 25 and the TFT 24 are covered with an alignment layer 26. The reflection plate 45 is covered with another alignment layer 27. A metal thin layer 44 of the reflection plate 45 functions as a counter electrode for the pixel electrodes 25 with a liquid crystal layer being interposed therebetween.

The reference numeral 22 denotes a liquid crystal confining layer between the active matrix substrate 20 and the reflection plate 45. For example, the liquid crystal confining layer 22 can be made by screen printing in an adhesive sealing agent containing spacers of 7 μm. After the liquid crystal confining layer 22 is formed, it is evacuated to produce a vacuum inside. Then, liquid crystal is confined in the layer 22. In the illustrated embodiment, a guest-host liquid crystal (manufactured by E. Merck) with 5% chiral material (manufactured by E. Merck) was confined in the layer 22 as the liquid crystal layer 21.

Figure 7:
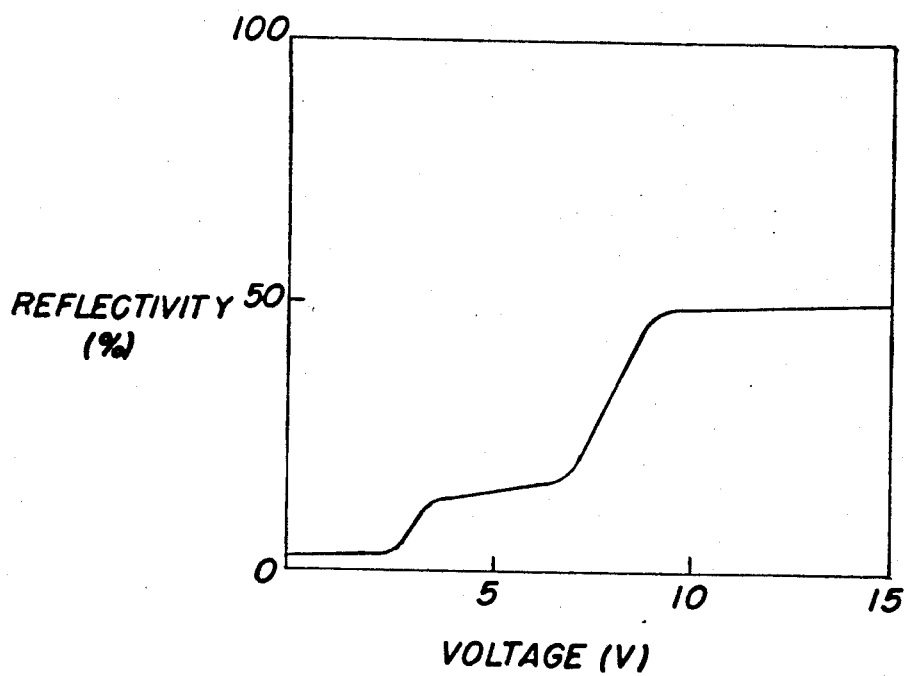
FIG. 7 is a graph showing the relationship between applied voltage and reflectivity in the reflection plate display device.

FIG. 7 shows the relationship between voltage and reflection characteristics of the finished reflective liquid crystal display device. The reflectivity was measured with the reflective liquid crystal display device placed at the position where the reflection plate 15 was placed in FIG. 2. The vertical axis indicates the resistivity, and the horizontal axis indicates the applied voltage between the pixel electrode 25 and the metal thin layer 44 (counter electrode). The resistivity of a light incident at an angle of 30° was measured by obtaining the ratio of the intensities of light diffusion along the respective normals to the reference white plate and the display device. As shown in FIG. 7, the reflectivity when the voltage was applied was 50%, and the ratio of contrast was 27.

In the illustrated embodiment, as the surface on which the metal thin layer 44 covering the reflection plate 45 is positioned toward the liquid crystal layer 21, no parallax is caused, thereby securing a satisfactory image representation. In addition, the metal thin layer 44 functions as a counter electrode, thereby eliminating the necessity of forming an extra counter electrode. Thus, the manufacturing process is simplified.

Figure 8:
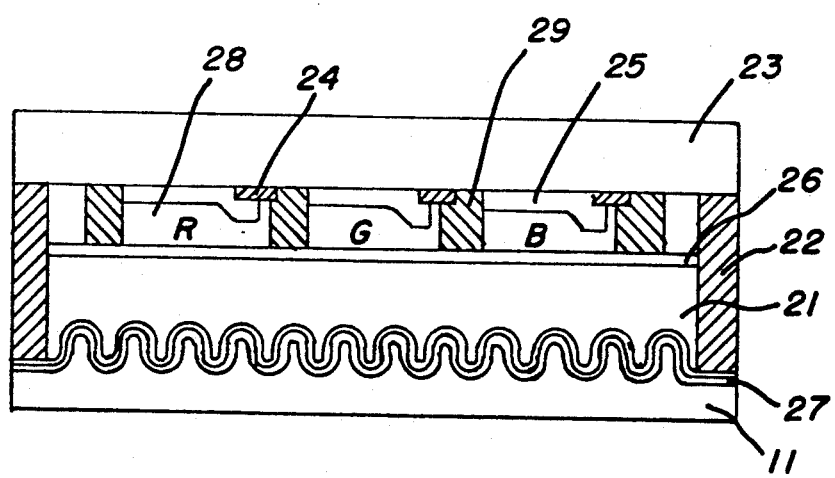
FIG. 8 is a cross-sectional view showing a reflective-type color liquid crystal display device modified by adding a color filter to the reflection plate display of FIG. 6.

In addition, as shown in FIG. 8, the color filter 28 is provided in each pixel electrode 25, and a black mask 29 is provided between the adjacent color filters 28. In this way the reflective-type liquid crystal display panel of the present invention can be easily adapted into a reflective-type color liquid crystal display device.

In the illustrated embodiment, the metal thin layer 44 is formed after the oxide layers 12 and 42 are formed on the substrate 11 but it is possible to abrade the substrate 11 on which an oxide film is formed, and after etching the abraded surface, to form the metal thin layer 44. Alternatively, it is possible to form an oxide film on the glass substrate 11 after it is abraded.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A reflective-type liquid crystal display device comprising a transmissive substrate including pixel electrodes, a reflection plate comprising a glass substrate, an oxide layer formed on a first surface of the substrate and etched to form an uneven surface on the first surface of the substrate, a metal thin layer covering the uneven surface, and a liquid crystal layer interposed between the substrate and the reflection plate.

2. The reflective-type liquid crystal display device according to claim 1, wherein the uneven surface of the substrate comprises a repetition of hills and valleys, the hills being arranged with plural pitches the average pitch of the pitches between one hill and an adjacent hill being not greater than 100 $\mu$m.

3. The reflective-type liquid crystal display device according to claim 1 or 2, wherein the surface on which the metal thin layer is formed is disposed toward the liquid crystal layer.

4. The reflective-type liquid crystal display device according to claim 3, wherein the metal thin layer functions as a counter electrode for the pixel electrodes with the liquid crystal layer being interposed.

5. A method for producing a reflective-type liquid crystal display device, the method comprising the steps of preparing a glass substrate, forming an oxide layer on a first surface of the substrate, etching the oxide layer of the substrate to form an uneven surface on the first surface of the substrate, and forming a metal think layer on the uneven surface.

* * * * *